E. T. RAMSAY.
DIRIGIBLE HEADLIGHT FOR MOTOR VEHICLES.
APPLICATION FILED MAY 23, 1922.
1,428,859.
Patented Sept. 12, 1922.
2 SHEETS—SHEET 1.
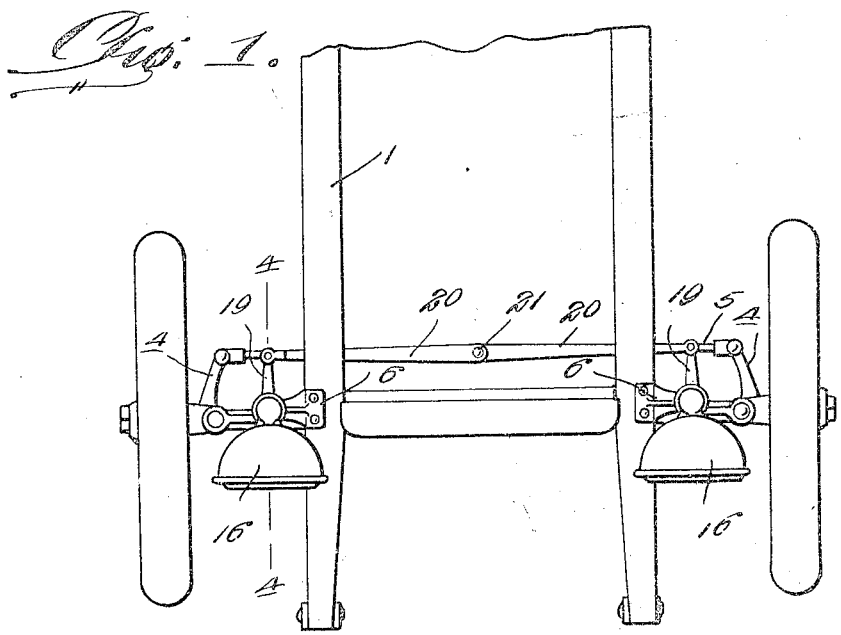
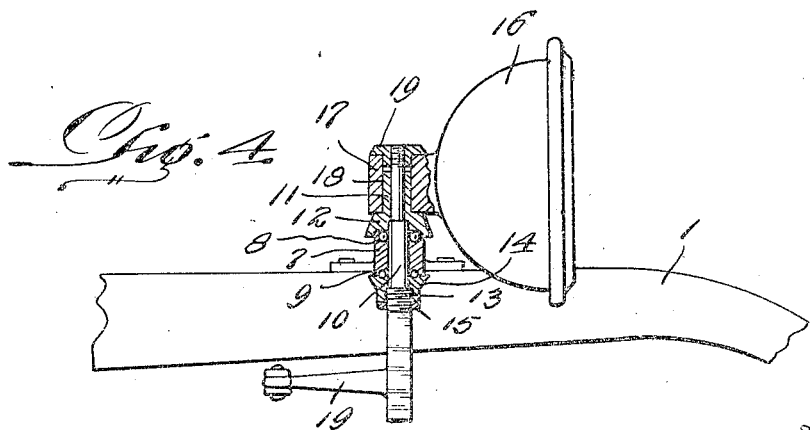
Witnesses:
Inventor
Ethan T. Ramsay,
By
Attorney E. T. RAMSAY.
DIRIGIBLE HEADLIGHT FOR MOTOR VEHICLES.
APPLICATION FILED MAY 23, 1922.
1,428,859. Patented Sept. 12, 1922.
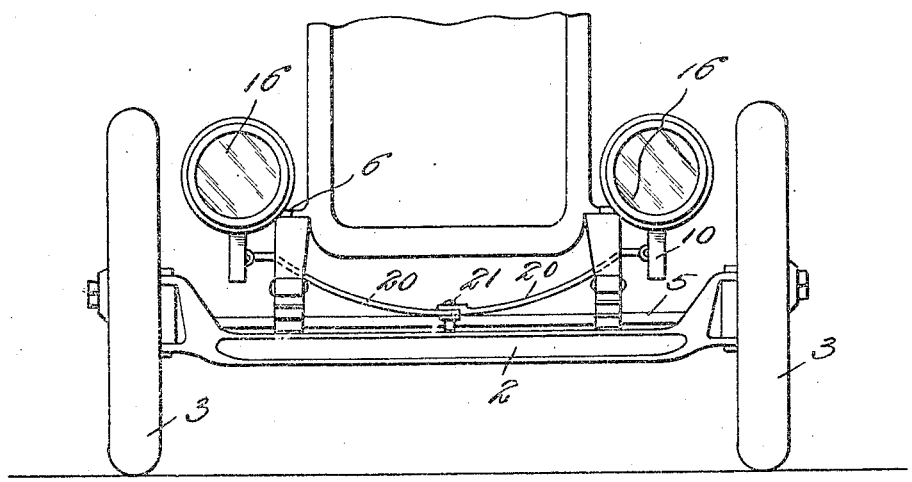
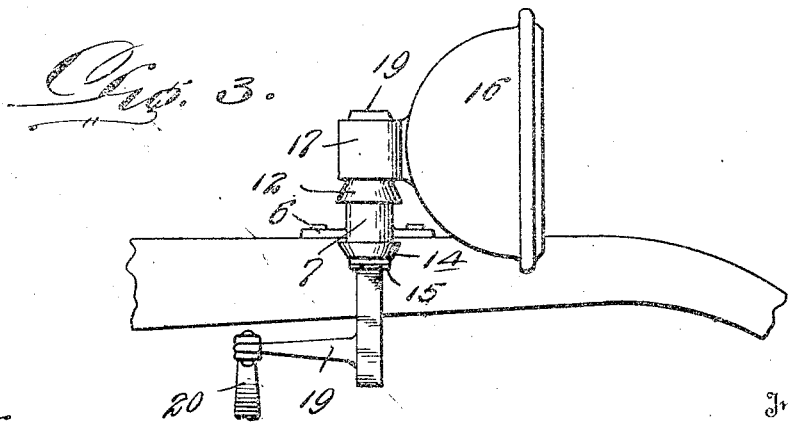
Witnesses:
Inventor
Ethan T. Ramsay,
Attorney Patented Sept. 12, 1922.

1,428,859

UNITED STATES PATENT OFFICE.

ETHAN T. RAMSAY, OF READING, PENNSYLVANIA.

DIRIGIBLE HEADLIGHT FOR MOTOR VEHICLES.

Application filed May 23, 1922. Serial No. 562,949.

*To all whom it may concern:*

Be it known that I, ETHAN T. RAMSAY, a citizen of the United States, residing at Reading, in the county of Berks and State of Pennsylvania, have invented new and useful Improvements in Dirigible Headlights for Motor Vehicles, of which the following is a specification.

In carrying out the present invention it is my purpose to improve and simplify the general construction of dirigible headlights for motor vehicles and to provide a dirigible headlight wherein the lamps will be so mounted as to turn easily and with a minimum of friction.

It is also my purpose to provide a dirigible headlight construction for motor vehicles wherein the parts may be readily taken down for purposes of repair or replacement.
With the above recited objects in view, and others of a like nature, the invention resides in the construction, combination and arrangement of parts set forth in and falling within the scope of the appended claim.
In the accompanying drawings:

Figure 1 is a fragmentary top plan view showing my invention installed on a motor vehicle.

Figure 2 is a front elevation of the same.
Figure 3 is a fragmentary side view thereof.

Figure 4 is a section on the line 4—4 of Figure 1.

Referring now to the drawings in detail, 1 designates the frame of a motor vehicle of any suitable or preferred construction, equipped with a front axle 2 and steering wheels 3 mounted upon spindles connected to the outer ends of the axle 2 for swinging movement, as is usual, the spindles being equipped with rearwardly extending arms 4 that are connected to each other by a tie rod 5 so that in the operation of the steering wheel motion will be transmitted to the steering wheels 3 to properly guide the vehicle.

In accordance with my invention I secure to the side bars of the chassis of the motor vehicle adjacent to the forward ends of such bars brackets 6—6 respectively that project beyond the sides of the respective side bars of the chassis. On the outer end of each bracket 6 is a vertical sleeve 7 having its top and bottom ends formed with race-ways 8 to receive anti-friction balls 9. Journaled in the sleeves 7, respectively, are vertical shafts 10 projecting above and below the sleeves. Surrounding the top portion of each shaft 10 is a sleeve 11 having its lower end formed with an annular flange 12. The lower end of the flange 12 is formed with a race-way corresponding to the race-way 8 in the upper end of the sleeve 7, and these race-ways receive the balls 9. Threaded onto the shaft 10 below the sleeve 7 is a bearing collar 13 having its upper end enlarged, as at 14, and formed with a race-way corresponding to the race-way 8 in the lower end of the sleeve 7, and these race-ways contain the balls 9 at the lower end of the sleeve. Also threaded onto the shaft 10 below the bearing collar 13 is a locking nut 15 that engages the bearing collar to lock the latter to the shaft. By means of this construction it will be seen that the shafts 10 may be rotated within the respective bearing sleeves 11 with a minimum of friction.

16—16 indicate the head lamps having their rear ends formed respectively with rearwardly projecting brackets 17, each formed with a vertical bore 18 adapted to receive the sleeve 11, and threaded onto the upper end of each shaft 10 is a clamping collar 19 that abuts the upper surface of the bracket to securely clamp the bracket to the sleeve 11, so that in the rotation of the shafts 10 motion will be transmitted to the head lamps 16.

In order that motion may be transmitted to the head lamps from the steering wheels, so that the lamps may follow the wheels, the lower ends of the shafts 10 are equipped with rearwardly extending arms 19 to which are pivotally connected the outer ends of links 20. The inner ends of these links are pivotally connected to each other and to the tie rod 5, as at 21.

From the foregoing description, taken in connection with the accompanying drawings, it will be seen that as motion is imparted to the steering wheels 3 to steer the vehicle a corresponding movement will be imparted to the arms 19 through the medium of the tie rod 5 and the links 20, thereby rotating the shafts 10 within the sleeves 7 with the effect to revolve the sleeves 11 and the brackets 18 clamped to such sleeves 11. Thus the lamps will be caused to follow the steering motion of the wheels.

Having thus described the invention, what is claimed as new, is:—

In dirigible headlight construction, brackets secured to the side bars of the chassis of the motor vehicle and extending outwardly from said bars, vertical sleeves on the outer ends of said brackets, respectively, a shaft journaled in each sleeve and projecting above and below the same, a sleeve surrounding the top portion of each shaft, an annular flange formed on the lower end of the second named sleeve, anti-friction bearings between said flange and the first mentioned sleeve, a bearing collar threaded onto the lower portion of said shaft below the first named sleeve and having its upper end enlarged, anti-friction bearings between the enlarged end of said collar and the lower end of the adjacent sleeve, a headlight carrying bracket formed with a vertical bore that receives the second named sleeve, a clamping collar threaded on the upper end of said shaft and engaging said bracket to hold the latter upon the second named sleeve and connections between the lower ends of said shafts and the tie rod of the steering gear of the motor vehicle.

In testimony whereof I affix my signature.

ETHAN T. RAMSAY.